Sept. 6, 1932.  W. OBERLE  1,876,339
WELL FISHING TOOL
Filed Dec. 29, 1931  2 Sheets-Sheet 2
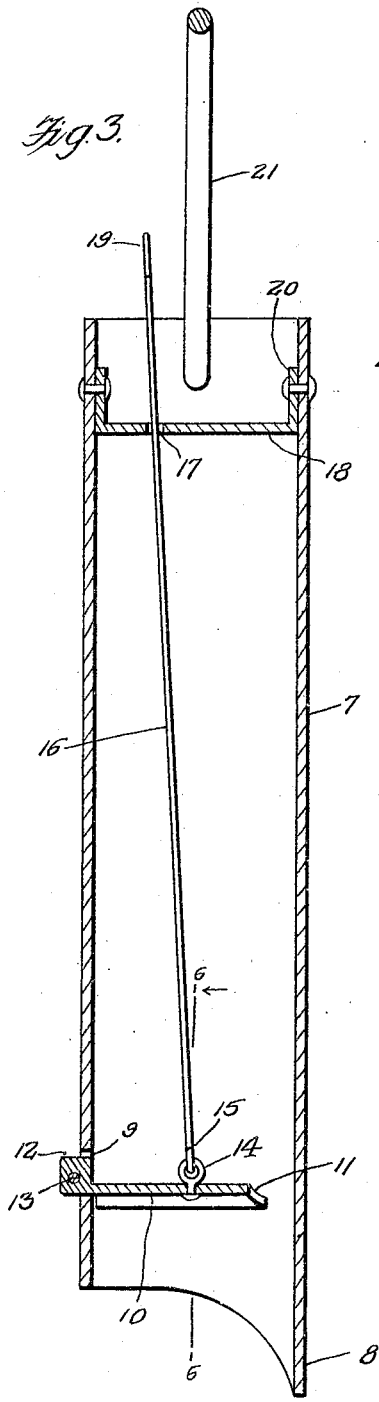
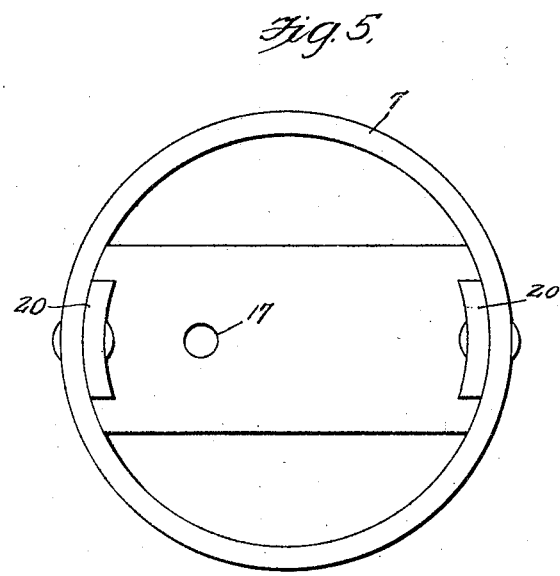
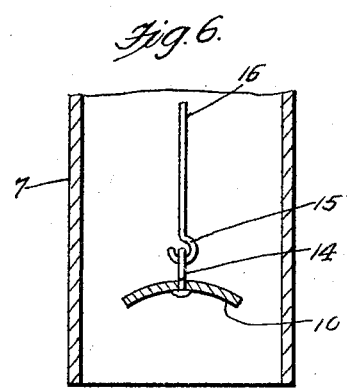
Inventor
William Oberle,
By *Clarence A O'Brien*
Attorney Patented Sept. 6, 1932

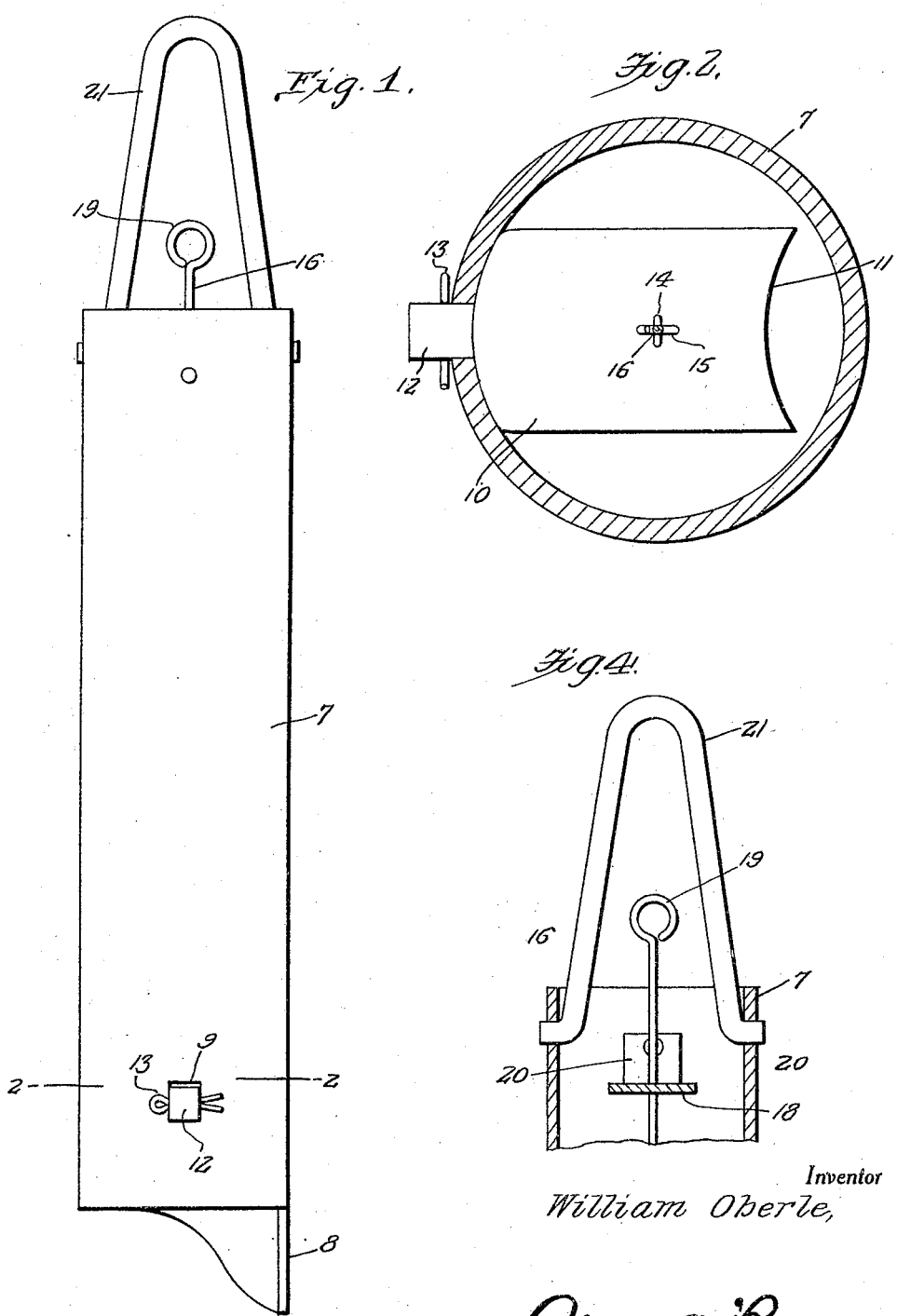

1,876,339

UNITED STATES PATENT OFFICE

WILLIAM OBERLE, OF BUSHTON, KANSAS

WELL FISHING TOOL

Application filed December 29, 1931. Serial No. 583,740.

This invention relates to an improved tool generally referred to in the prior art as a well fishing tool, and, as the name implies, used for depth retrieving of lost implements such as become lodged in the bottom of a well.

As conveyed by the foregoing statement of the invention, I am aware that various instruments and tools have been devised and patented for accomplishing the above-mentioned results. My primary aim therefore is to provide a structurally distinguishable tool calculated to better fulfill the requirements of well equipment of this class because of the choice selection and unification of parts.

Knowing as I do that the art to which the invention relates is already well developed, I have accomplished the desired betterment of results through the development of a fishing tool characterized by a novel quick releasable implement catch, a guiding pilot extension on the lower end of the tubular body of the tool, and other important features.

In the drawings,

Figure 1 is an elevational view of a fishing tool constructed in accordance with the present invention.

Figure 2 is a horizontal section on the line 2—2 of Figure 1.

Figure 3 is a longitudinal sectional view.

Figure 4 is a fragmentary view in section and elevation of the upper portion of Figure 3, observing the assembly at right angles.

Figure 5 is a plan view with certain of the parts removed.

Figure 6 is a fragmentary vertical section on the line 6—6 of Figure 3.

The body of the tool is in the form of an opened ended tube 7 of appropriate diameter. At its lower end this tube is fashioned with a somewhat pointed extension 8 which functions as a pilot and aids in "feeling" the object and implement in the bottom of the well. Moreover, it aids in permitting the tube 7 to be descended and avoids canting of the tube.

Near the lower end is a square aperture 9 which serves to accommodate a portion of the swingably mounted catch 10. This catch comprises a somewhat rectangular plate transversely curved and having a segmental notch 11 formed in the gripping ends thereof, said notch being adapted to securely engage the object or implement (not shown) adapted to be gripped and lifted up with the tool. This plate 9 is formed with a block-like extension or tang 12 which extends through the aperture 9 and carries a retaining cotter key 13. This provides the desired rocking connection between the plate and the tube and the shape of the parts 12 and the correspondingly shaped opening 9 prevents lateral wobbling of the catch.

It will be observed that intermediate its ends the catch is provided with a swivel eyebolt 14 to which an eye 15 on the lower end of the trip or release rod 16 is connected. This rod 16 extends up through a guide opening 17 in a spider bar 18. In fact the rod extends up and beyond the upper end of the tube 7 where it is fashioned with a finger ring 19.

The bar 18 forming the spider is provided with laterally directed ends 20 riveted or otherwise fastened to diametrically opposite points of the tube. The numeral 21 merely designates a lifting and lowering bail.

In practice, the tool is employed in the customary manner. In other words, the suspension rope, cable or other flexible element is attached to the bail 21 at the crown portion thereof, and the tool is lowered down in the well and manipulated as conditions may require in order to locate the lost object so that it may be grasped and elevated.

The manner of manipulation of the tool in locating the object is of course a matter of experience. The principal thing to do is to attempt to lower the tube 7 over the object so that the object will be confined in the lower portion of said tube. This action lifts the latch or catch 10 so that the free swingable end thereof will bind the object between the notched end 11 of the catch and the interior of the tube 7. Then the tool with the object trapped therein is elevated as is evident. The catch 10 may be conveniently released by properly manipulating the releasing rod 16.

The points of novelty to be observed are as follows:

The disposition of a bar-like spider 18 in the upper end portion of the tube 7 for reinforcing purposes and to provide a guide for the rod 16 is believed important. This part 18 also serves as a stop or an abutment preventing the tube 7 from being lowered too far down on the object adapted to be retrieved.

The curved formation of the catch plate 10 with the notched end 11 and the block-like pivotal connection 12 arranged in the aperture 9 is believed to be another structural feature of distinction. Then too, the extension 8 constituting the pilot to facilitate location of the lost object is an added distinction.

It is though from the foregoing description that the advantages and novel features of the invention will be readily apparent. It is to be understood that changes may be made in the construction and in the combination and arrangement of the several parts provided that such changes fall within the scope of the appended claims.

I claim:

1. A well fishing tool of the class described comprising a tubular body provided near its lower end with a substantially square aperture, a catch comprising a substantially rectangular plate having its free end formed with a curvate notch having its opposite end curved to conform to the interior of the body and further formed at said last-named end with a thickened block-like extension projecting through and beyond the aperture, said extension being formed with an opening, a key in said opening constituting a pivotal retaining connection for the plate, and a release rod pivotally attached at its lower end to the intermediate portion of said plate.

2. A well fishing tool of the class described comprising an open-ended tubular body provided at its lower end with an extension constituting a pilot, a pivoted catch mounted in the lower end portion of said body, a spider mounted in the upper end portion thereof, said spider being provided with a guide hole located adjacent that part of the spider which is attached to the same side of the body to which the catch is pivoted, a release rod formed at its upper end with a finger ring and extending down through said guide hole and swivelly connected at its lower end with the free swingable end of said catch, together with a lifting bail attached to the upper end of said body.

In testimony whereof I affix my signature.

WILLIAM OBERLE.